United States Patent [19]
Ostrom

[11] 3,778,180

[45] Dec. 11, 1973

[54] CIRCUIT BOARD DRILL AND METHOD
[75] Inventor: Charles T. Ostrom, Gardena, Calif.
[73] Assignee: Federal-Mogul Corporation, Southfield, Mich.
[22] Filed: Mar. 10, 1972
[21] Appl. No.: 233,563

[52] U.S. Cl.................. 408/226, 408/230, 408/704
[51] Int. Cl............................................. B23b 51/02
[58] Field of Search................... 408/224, 230, 704, 408/226, 229, 1

[56] References Cited
UNITED STATES PATENTS
2,897,695  8/1959  Winslow ............................ 408/224
3,534,640  10/1970  Macy ................................. 408/226
252,704  1/1882  Southwick ......................... 408/224
3,645,642  2/1972  Koslow ............................ 408/230 X Primary Examiner—Andrew R. Juhasz
Assistant Examiner—Z. R. Bilinsky
Attorney—Benjamin H. Sherman et al.

[57] ABSTRACT

A circuit board drill of the straight shank shouldered type has the cutting edge flutes extended up through the shoulder between the shank and the smaller diameter fluted portion of the drill to enable rejecting of drilled material shavings, such as copper which otherwise tend to cling to the shoulder.

3 Claims, 3 Drawing Figures

PATENTED DEC 11 1973  3,778,180
Fig. 2
Fig. 1
Fig. 3
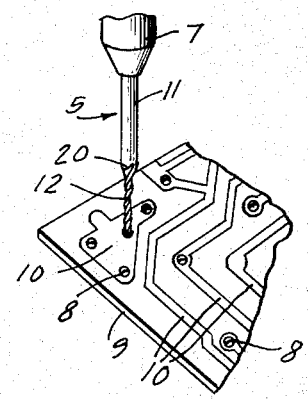
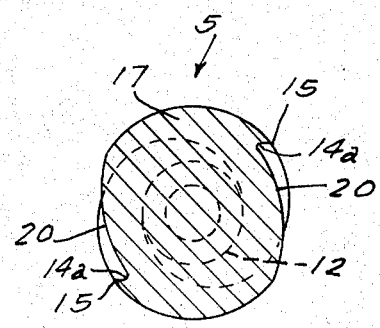
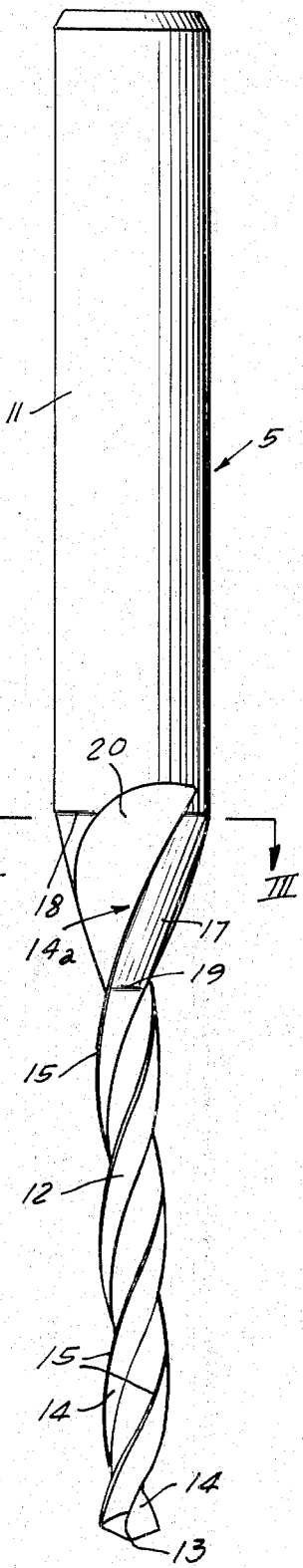

CIRCUIT BOARD DRILL AND METHOD

This invention relates to circuit board drills and method and is more particularly concerned with eliminating the problem of clinging of drilled material on and about the drill shoulders.

In the production of printed circuit boards and the like it is generally necessary to drill various holes therethrough. High precision drills have been provided for this purpose and in order to facilitate chucking and eliminate need for an inventory of collets for each size drill, a standard or common shank size is highly desirable for the drills even though the smaller diameter pointed, fluted drilling section of the drills may vary greatly throughout a large selective range to meet various practical, production requirements. Such drills are commonly constructed with a shoulder at juncture of the larger and smaller diameter portions or sections of the drills.

In the drilling of at least certain types of objects such as circuit boards a problem is often encountered, especially in high production run operations, due to the accumulation of ringlets of malleable metal such as copper on and about the shoulder of the drill and which may build up to the extent of clogging the drill and preventing proper drilling depth penetration of the workpiece. For example, printed circuit boards have thin malleable metal, such as copper, conductor areas through which holes must be drilled. The chips or shavings of malleable material removed by the cutting edges of the drill frequently develop into ringlets on and about and tend to cling to the drill shoulder. An accumulation of such clinging material interferes with proper drilling depth of penetration and may have a deleterious abrading effect on the area about the drilled hole, especially in high speed drilling operations.

An important object of the present invention is to overcome the foregoing and other disadvantages, defects, inefficiencies, shortcomings and problems in prior drills and methods of drilling and to attain important advantages and improvements as will hereinafter become apparent.

Another object of the invention is to provide improvements in drilling through materials that may tend to cling and build up at the juncture between a fluted drill section and a larger diameter shank.

A further object of the invention is to provide a new and improved drill and method especially useful in drilling circuit boards.

Yet another object of the invention is to provide novel means on a tapered shoulder between the fluted section and a larger diameter shank of a drill to assure rejection of material that may tend to build up thereon during drilling of certain materials.

Other objects, features and advantages of the invention will be readily apparent from the following description of a preferred embodiment thereof, taken in conjunction with the accompanying drawing, although variations and modifications may be effected without departing from the spirit and scope of the novel concepts embodied in the disclosure, and in which:

FIG. 1 is a perspective view showing a drilling assembly embodying features of the invention, and a workpiece;

FIG. 2 is a side elevational view of a drill embodying features of the invention; and FIG. 3 is a sectional view taken substantially along the line III—III of FIG. 2.

By way of illustration, a drill 5 is shown which is of a type especially suitable to be supported in a holder or collet 7 (FIG. 1) which is part of a drilling machine (not shown) especially equipped for drilling holes 8 in a workpiece such as a circuit board 9 carrying on the faces thereof printed integrated circuit 10 of preferred kind and character. Commonly, the printed circuit 10 comprises electrodeposited copper, and the holes 8 are through the various printed circuit areas as required for integration of the circuit and mounting of various components such as transistors in operative relation on the board, as is well-known practice.

In order to standardize on collet size and eliminate any need for an inventory of collets for each size drill, the drill 5 is provided with a shank 11 of a common diameter with all other drills to be used in drilling the holes 8. For example, the shank 11 may be one-eighth inch in diameter, which is a practical size for drills in a range of from about 1 inch to 1½ inch o.a.l. commonly employed for this purpose. This provides a shank of desirable strength and rigidity assisting in accuracy of hole location and enables maintaining hole size tolerance to close limits. It also completely eliminates need for drill bushings when used with precision spindles and collets. Although the shank 11 of the drill 5 will be the same diameter as all other drills that may be used for the same purpose, its fluted drilling portion 12 may vary in length and diameter according to the preferred hole diameter and relative depth of penetration of the circuit board to meet circuit board design requirements. In practice the fluted drilling sections 12 may be from one-eighth inch to three-eighths inch long and from 0.035 inch to 0.1200 inch in diameter. At its distal end, the section 12 has a cutting tip 13 from which spiral flutes 14, of which two are shown in the illustrated example, extend throughout the length of the section 12 and with their cutting edges 15 directed in the same rotary direction.

By reason of the size differential between the shank 11 and the concentric fluted section 12 the juncture therebetween is desirably in the form of a shoulder 17. For structural reasons, the shoulder 17 is desirably of generally frusto-conical shape having its widest end 18 at the shank 11 and its narrowest end 19 at the fluted section 12. Heretofore it has been common practice to end the flutes 14 at the narrowest end 19 of the shoulder 17. With some frequency a continuous chip or shaving of the circuit board material runs up one or both of the flutes 14 and accumulates as one or more curls or ringlets onto and about the shoulder 17 to the interference with and the detriment of production drilling operation. Malleability of the copper material may cause the shaving ringlets to build up and accumulate, interfering with proper penetration of the drill in the workpiece and due to high speed operation damage the printed circuit area being drilled. Drill breakage may also result from shavings or chips loading in the drill flutes.

To alleviate the problem of drilled shaving or chip material accumulation on or at the shoulder 17, means are provided for rejecting such drilled material from the shoulder area of the drill. To this end, each of the flutes 14 is extended on through the smaller diameter end 19 of the shoulder 17 and along at least the major extent of the shoulder and preferably on through the widest end 18. Such extension of the flutes is desirably effected as a continuation of the flute helix and with a gradual diminution in depth of the flute to run out at the inner end of the shank 11. This relationship is observed in FIG. 3 where the shoulder extent 14a of each of the flutes is illustrated as substantially shallower at run out than the fluted cutting or drilling portion 12 of the drill. In addition, a cam ejection surface 20 of substantial width is provided at the side of the spiral flute extension section 14a in each instance, as shown, at the side of the groove opposite the cutting edge 15 on the shoulder 17. Thereby a drill shaving working up from the flute 14 in either instance into the flute extension 14a is rejected as the depth of the extension 14a progressively diminshes and flares laterally on the shoulder 17, and the shaving moves therefrom onto the flaring laterally biased cam surface 20 and drops away from the shoulder. This entirely avoids any tendency for the shaving to curl onto and about the shoulder as heretofore experienced where the flutes 14 terminated at about the narrow end 19 of the shoulder 17.

From the foregoing it will be apparent that as the drill 5 is supported and rotatably driven as by means of the holder 7, by and through the shank 11 of the drill, and the drilling section 12 of the drill is driven in drilling relation into the workpiece 9 and more particularly through one of the printed circuit areas 10, any drill-produced shaving that may otherwise tend to remain and accumulate at the juncture shoulder 17 is rejected as by running out at the progressively diminishing and laterally biased flute-groove extensions 14a and the cam surface 20. As a result, the drill completes every drilling operation substantially clean and ready to repeat performance with utmost efficiency throughout its useful life.

It will be understood that variations and modifications may be effected without departing from the spirit and scope of the novel concepts of this invention.

I claim as my invention:

1. In a drill especially suitable for printed circuit boards having printed copper circuits, the drill including a shank and a concentric smaller diameter fluted drilling section joined to the shank by a frustoconical shoulder having its widest end at the shank and its narrowest end at the fluted drilling section, the shank being adapted to be supported by means for rotatably driving the drill through the shank and thereby driving the drilling section in drilling relation into a work piece, and the drilling section having a plurality of uniform spiral drilling flutes with cutting edges along one side, the improvement comprising:

said flutes having extensions in the spiral direction of the flutes in said shoulder and running out at said widest end of the shoulder, said flute extensions comprising grooves which extend in continuation of the grooves along the cutting edges of the flutes and following the frustum of the shoulder and diminishing in depth from said narrowest end to said widest end of the shoulder; and a cam surface along each of the flute extensions flaring from the diminishing extension grooves to a substantially greater width than the flutes;

whereby shavings moving up the flutes during drilling move from the ends of the flutes onto the flaring cam surfaces and are biased to drop away from the shoulder.

2. A drill according to claim 1, said cam surfaces running out along said shoulder and at said shank adjacent to said widest dimension of the shoulder are free from any overhang or obstruction which might interfere with smooth rejection of a shavings biased by the cam surfaces to drop away from the shoulder.

3. A drill according to claim 1, wherein said cam surfaces extend smoothly laterally from the diminishing flute extensions to a progressively greater width and run out over the flute extensions adjacent to said widest dimension of the shoulder.

* * * * *